United States Patent
Kojo (10) Patent No.: US 10,249,056 B2
(45) Date of Patent: Apr. 2, 2019

(54) VEHICLE POSITION ESTIMATION SYSTEM

(71) Applicant: Nissan North America, Inc., Franklin, TN (US)

(72) Inventor: Naoki Kojo, Sunnyvale, CA (US)

(73) Assignee: Nissan North America, Inc., Franklin, TN (US)

( * ) Notice: Subject to any disclaimer, the term of this patent is extended or adjusted under 35 U.S.C. 154(b) by 668 days.

(21) Appl. No.: 14/251,058

(22) Filed: Apr. 11, 2014

(65) Prior Publication Data

US 2015/0294465 A1 Oct. 15, 2015

(51) Int. Cl.
*G06T 7/80* (2017.01)

(52) U.S. Cl.
CPC ...... *G06T 7/80* (2017.01); *G06T 2207/10016* (2013.01); *G06T 2207/30252* (2013.01)

(58) Field of Classification Search
CPC . G06T 2207/10016; G06T 2207/30252; G06T 7/0018; B60R 1/00
See application file for complete search history.

(56) References Cited

U.S. PATENT DOCUMENTS

| | | | | |
|---|---|---|---|---|
| 8,346,071 B2* | 1/2013 | Higashibara | .............. | B60R 1/00 348/148 |
| 2002/0122117 A1* | 9/2002 | Nakagawa | ............. | H04N 5/232 348/218.1 |
| 2015/0029338 A1* | 1/2015 | Lee | ........................ | B60W 40/02 348/148 |

FOREIGN PATENT DOCUMENTS

| | | | | |
|---|---|---|---|---|
| DE | 102009057996 A1 * | 5/2011 | .............. | G06T 7/73 |
| JP | 2013-185871 A | 9/2013 | | |

* cited by examiner

Primary Examiner — Maria E Vazquez Colon
(74) Attorney, Agent, or Firm — Global IP Counselors, LLP (57) ABSTRACT

A system for calculating the sensitivity of a camera in a vehicle control system includes an internal parameter system, a controller, and a storage device. The internal parameter system is configured to determine an image coordinate of a first pixel in an image. The controller is configured to determine a point on the ground corresponding to the first pixel in the image based on external parameters. The controller is further configured to move the vehicle in a virtual world a predetermined distance, identify a second pixel in the image to which the point of the ground corresponds after the vehicle is moved in the virtual world, and calculate the sensitivity of the camera based on the distance between the position of the first pixel and the position of the second pixel. The storage device is configured to store the sensitivity of the camera.

19 Claims, 4 Drawing Sheets

FIG. 9

VEHICLE POSITION ESTIMATION SYSTEM

BACKGROUND

Field of the Invention

The present invention generally relates to a vehicle control system in an autonomous vehicle. More specifically, the present invention relates to a system for adjusting the sensitivity of a vehicle control system in an autonomous vehicle.

Background Information

As understood in the art, an autonomous vehicle includes a vehicle control system that is capable of performing driving operations to guide the vehicle to a predetermined destination without input from the driver or with only minimal input from the driver. The vehicle control system typically uses a plurality of high speed cameras to monitor areas surrounding the vehicle. The cameras detect, for example, traffic lights, signs, intersection markers, other vehicles and obstacles, and provide visual data to the vehicle control system, Conventional vehicle control systems compute the position of a vehicle by comparing an image of a stored three dimensional map and a camera image. In particular, an edge image is extracted from an actual image acquired by a vehicle camera with which the vehicle is equipped. The position and attitude angle of the vehicle camera is adjusted so that a virtual image from a three dimensional map which recorded the position and type of edge of the environment by three dimensions is projected on the positional attitude of the vehicle camera. Accordingly, the position and attitude angle in three dimensional space of the vehicle camera can be estimated.

Moreover, successive images from cameras can be compared to determine the movement of the vehicle. Specifically, by comparing the location of a plurality of matching pixels from successive images, distance information can be obtained. The distance information can be compiled to determine movement of the vehicle in various directions and angles.

SUMMARY

It has been discovered that in vehicle control systems, assuming all landmarks are on the same plane e.g., road), calculation of position and orientation error of each image pixel in an image captured by a camera can be calculated before the vehicle is en route to a specific destination. Thus, the sensitivity of each pixel can be adjusted prior to en route navigation. Such a system results in increased computation times, and the distance to objects does not have to be continuously calculated.

In one disclosed embodiment, a system for calculating the sensitivity of a camera in a vehicle control system comprises an internal parameter system, a controller, and a storage device. The internal parameter system is configured to determine an image coordinate of a first pixel in an image. The controller is configured to determine a point on the ground that corresponds to the first pixel in the image based on a positioning system. The controller is further configured to move the vehicle in a virtual world a predetermined distance or at a predetermined angle, identify a second pixel in the image to which the point of the ground corresponds after the vehicle is moved in the virtual world, and calculate the sensitivity of the camera based on a distance between the position of the first pixel in the image and the position of the second pixel in the image. The storage device is configured to store the sensitivity of the camera.

In another embodiment, a system for visual map matching for a vehicle comprises a camera, an internal parameter system, a controller, and a storage device. The camera is disposed on the vehicle, and is configured to capture an image of an object external to the vehicle, such that the image can be displayed using at least a first pixel and a second pixel in an array of pixels. The internal parameter system is configured to determine an image coordinate of the first pixel in the image. The controller is configured to determine a point on the ground that corresponds to the first pixel in the image based on a positioning system, move the vehicle in a virtual world a predetermined distance or at a predetermined angle, identify the second pixel in the image to which the point of the ground corresponds after the vehicle is moved in the virtual world the predetermined distance, and calculate the sensitivity of the camera based on a distance between the position of the first pixel in the image and the position of the second pixel in the image. The storage device is configured to store the sensitivity of the camera.

In another embodiment, a method of calculating the sensitivity of a camera in a vehicle control system comprises determining an image coordinate of a first pixel in an image, determining a point on the ground that corresponds to the first pixel in the image based on a positioning system, moving the vehicle in a virtual world a predetermined distance or at a predetermined angle, identifying a second pixel in the image to which the point of the ground corresponds after the vehicle is moved in the virtual world, calculating the sensitivity of the camera based on a distance between the position of the first pixel in the image and the position of the second pixel in the image, and storing the sensitivity of the camera.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

The disclosed embodiments are for a sensitivity modification system 10 that adjusts or sets the sensitivity of a vehicle control system 12 (e.g., a vehicle map matching system) disposed on a host autonomous vehicle 100. It is noted that sensitivity modification system 10 may be used in a non-autonomous vehicle, if desired. The controller 14 of the sensitivity modification system 10 can adjust the sensitivity of pixels, with respect to both position and angle of the vehicle, in a pixel array for a camera in a vehicle control system 12 prior to en route navigation.

Figure 1:
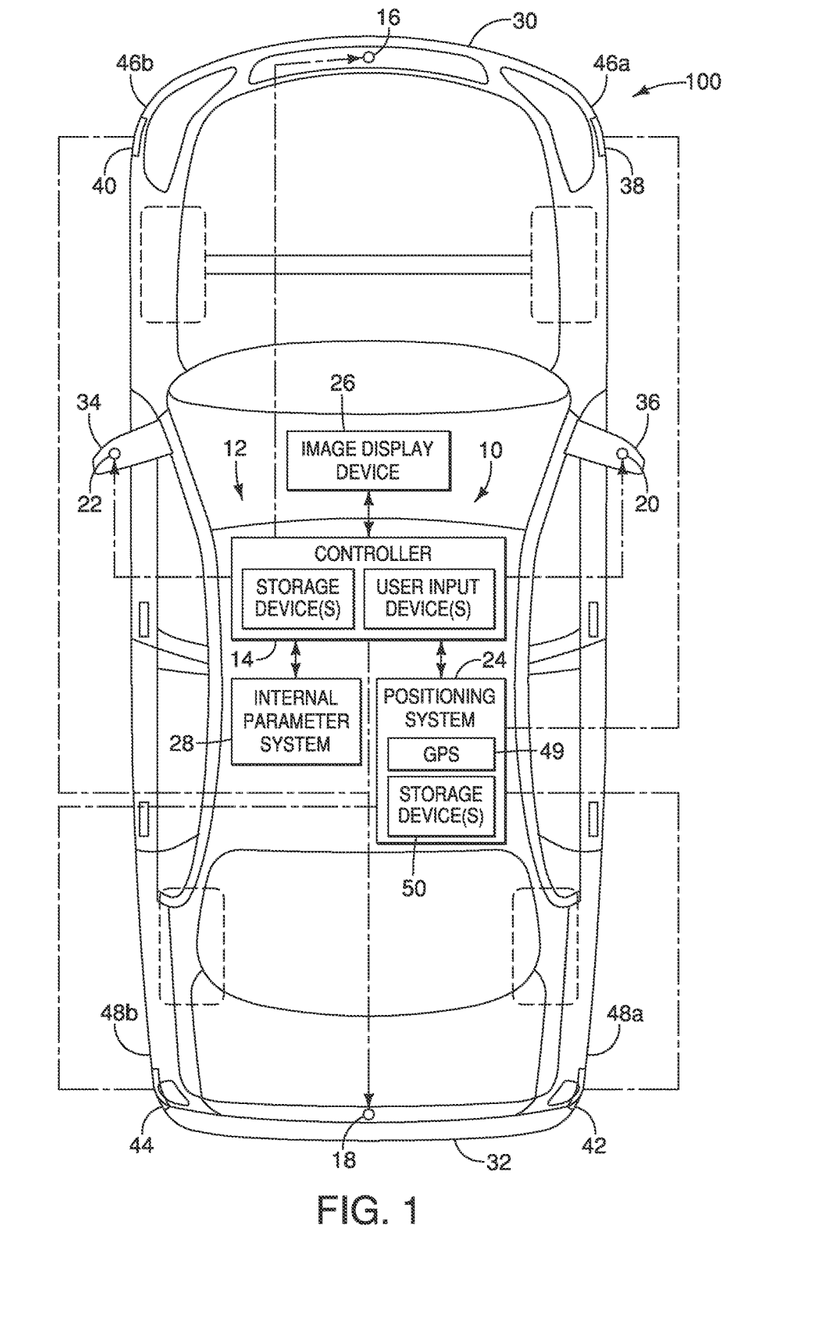
FIG. 1 is a schematic top view of an autonomous vehicle having a vehicle control system according to one embodiment.

Referring initially to FIG. 1, an autonomous vehicle 100 having a vehicle control system 12 is illustrated in accordance with a first embodiment. The vehicle control system 12 includes the sensitivity modification system 10, which in turn can includes a controller 14, a plurality of cameras 16, 18, 20, 22, a positioning system 24, an image display device 26, and an internal parameter system 28. It is noted that the each of these components may also be considered as part of the overall vehicle control system 12, and the sensitivity modification system 10, which is part of the vehicle control system 12, can include as many or as few components or elements necessary to modify the sensitivity of the pixels in the camera as described herein.

The controller 14 preferably includes a microcomputer with a control program that controls the vehicle control system 12 as discussed below. The controller 14 can also include other conventional components such as an input interface circuit, an output interface circuit, and storage devices such as a ROM (Read Only Memory) device and a RAM (Random Access Memory) device. The microcomputer of the controller 14 is programmed to control one or more of the plurality of cameras 16, 18, 20, 22, the image display device 26, the internal parameter system 28 and the positioning system 24, and to make determinations or decisions, as discussed herein. The memory circuit stores processing results and control programs, such as ones for the plurality of cameras 16, 18, 20, 22, the image display device 26, the internal parameter system 28 and the positioning system 24 operation that are run by the processor circuit. The controller 14 is operatively coupled to the plurality of cameras 16, 18, 20, 22, the image display device 26, the internal parameter system 28 and the positioning system 24 in a conventional manner, as well as other electrical systems in the vehicle, such the turn signals, windshield wipers, lights and any other suitable systems. Such a connection enables the controller 14 to monitor and control any of these systems as desired. The internal RAM of the controller 14 stores statuses of operational flags and various control data. The internal ROM of the controller 14 stores the information for various operations. The controller 14 is capable of selectively controlling any of the components of the vehicle control system 12 in accordance with the control program. It will be apparent to those skilled in the art from this disclosure that the precise structure and algorithms for the controller 14 can be any combination of hardware and software that will carry out the functions of the present invention.

As shown in FIG. 1, the controller 14 can include or be in communication with user input devices. The user input devices can include, for example, a human-machine interface (HMI) which enables a user (e.g., the driver and/or passenger) to interact with the vehicle control system as understood in the art and discussed herein. The controller 14 can further include or be in communication with one or more storage devices which can store information as discussed herein.

Figure 2:
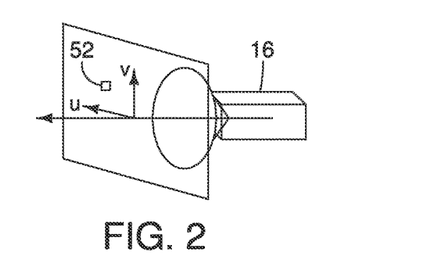
FIGS. 2 and 3 illustrate the process of determining the image coordinate of a pixel in an image according to one embodiment.

As illustrated in FIG. 1, in one disclosed embodiment, a plurality of cameras 16, 18, 20, 22 (or optical sensors) are disposed on the external surface of the vehicle 100. It is noted that, although the optical sensors are preferably cameras 16, 18, 20, 22, the optical sensors may be any type of suitable optical sensors. In this embodiment, the cameras 16, 18, 20, 22 include four digital cameras disposed in a front 30 of the vehicle 100, a rear 32 of the vehicle 100, on the left side mirror 34 of the vehicle 100 and right side mirror 36. However, the cameras 16, 18, 20, 22 may be mounted on any suitable external portion of the host vehicle, including the front and rear quarter panels, or any combination of suitable areas. The cameras 16, 18, 20, 22 are preferably solid state image pickup devices, such as charge coupled device (CCD). Additionally, as illustrated in FIG. 2, the cameras 16, 18, 20, 22 are arranged around the vehicle 100 and have lenses that enable imaging substantially surrounding or completely surrounding the host vehicle 100 (e.g., fish-eye cameras which have an enlarged angular field).

In one embodiment, the positioning system 24 can include a plurality of vehicle sensors 38, 40, 42, and 44 that are configured to detect a remote object in proximity to the vehicle. For example, as illustrated in FIG. 1, the remote vehicle sensors 38, 40, 42, and 44 are preferably mounted externally on the front quarter panels 46a and 46b and rear quarter panels 48a and 48b of the vehicle 100. However, the sensors 38, 40, 42, and 44 may be mounted on any suitable external portion of the vehicle 100, including the front and rear bumpers, the external mirrors or any combination of suitable areas. The sensors 38, 40, 42, and 44 transmit data to the positioning system 24, which is then capable of using the sensor data to calculate the position of the vehicle 100 using odometry.

The vehicle sensors 38, 40, 42, and 44 can be any type of sensors desirable. For example, the front sensors can include a long-range radar device for object detection in front of the host vehicle. The front sensors may be configured to detect objects at a predetermined distance (e.g., distances up to 200 m), and thus may have a narrow field of view angle (e.g., around 15°). Due to the narrow field of view angle, the long range radar may not detect all objects in the front of the host vehicle. Thus, if desired, the front corner sensors can include short-range radar devices to assist in monitoring the region in front of the host vehicle. The rear sensors may include short-range radar devices to assist in monitoring oncoming traffic beside and behind the host vehicle. Placement of the aforementioned sensors permits monitoring of traffic flow including remote vehicles and other objects around the host vehicle, and the position of the vehicle 100 with respect to maintaining lane position or lane departure. However, the sensors 38, 40, 42, and 44 can be disposed in any position of the vehicle 100 and may include any type and/or combination of sensors to enable detection of a remote objects. In addition, the sensors may be cameras, radar sensors, photo sensors or any combination thereof. Although FIG. 1 illustrates four sensors, 38, 40, 42, and 44 there can be as few or as many sensors desirable or suitable.

Although sensors 38, 40, 42, and 44 preferably are electronic detection devices that transmit either electronic electromagnetic waves (e.g., radar), these sensors can be any suitable sensors that, for example, take computer-processed images with a digital camera and analyzes the images or emit lasers, as is known in the art. The sensors may be capable of detecting at least the speed, direction, yaw, acceleration and distance of the vehicle 100 relative to a remote object. Further, the sensors 38, 40, 42, and 44 may include object-locating sensing devices including range sensors, such as FM-CW (Frequency Modulated Continuous Wave) radars, pulse and FSK (Frequency Shift Keying) radars, sonar and Lidar (Light Detection and Ranging) devices, and ultrasonic devices which rely upon effects such as Doppler-effect measurements to locate forward objects. Object-locating devices may include charged-coupled devices (CCD) or complementary metal oxide semi-conductor (CMOS) video image sensors, and other known camera/video image processors which utilize digital photographic methods to "view" forward objects including one or more remote vehicles. The sensors are in communication with the controller 14 through position system 24, and are capable of transmitting information to the controller 14.

Moreover, as illustrated in FIG. 1, the positioning system 24 may include a wireless communications device, such as a GPS 49. In one embodiment the vehicle 100 receives a GPS satellite signal. As is understood, the GPS 49 processes the GPS satellite signal to determine positional information (such as location, speed, acceleration, yaw, and direction, just to name a few) of the vehicle 100. As noted herein, the positioning system 24 is in communication with the controller 14, and is capable of transmitting such positional information regarding the vehicle 100 to the controller 14.

The positioning system 24 also can include a storage device 50 that stores map data. Thus, in determining the position of the vehicle 100 using any of the herein described methods, devices or systems, the positioning of the vehicle 100 may be compared to the known data stored in the storage device. The storage device 50 may also store any additional information including the current or predicted vehicle position and any past vehicle position or any other suitable information.

Preferably, the vehicle 100 is provided with an internal parameter system 28 that is configured to determine image coordinates of pixels in an image. That is, the internal parameter system 28 is configured to determine image coordinates of a plurality of pixels in a pixel array, including the image coordinates of a first pixel and a second in an image. In one embodiment, the internal parameter system 28 may be an internal calibration unit, such as Omnidirectional Camera Calibration (OCamCalib). However, the internal parameter system 28 may be any suitable device or system that would enable determination of image coordinates of pixels in an image.

Moreover, the sensitivity modification system 10 further includes a display device 26 (i.e., an image displaying device) that is mounted in an interior of the vehicle 100 such as in an instrument panel of the vehicle 100 as illustrated in FIG. 1. The display device 26 is configured and arranged to display the display image generated by the controller 14 for a driver of the vehicle. In one embodiment, the image display device 26 can display the imaging process for modification of the sensitivity of the cameras 16, 18, 20, 22. The display device 26 is operatively connected to the controller 14 in a conventional manner such as using wireless communication or wires such that the controller 14 can control the operations of the display device 26. More specifically, the controller 14 is configured to generate a video image including the regions directly forward, rearward and laterally of the vehicle 100 based on the images captured by the cameras 16, 18, 20, 22, and to display the generated image on the display device 26. Thus, the display device 26 is operatively connected to the cameras 16, 18, 20, 22 via the controller 14 to display images captured by the cameras 16, 18, 20, 22. In the illustrated embodiment, the controller 14 is programmed to process the images of the cameras 16, 18, 20, 22 to display a vehicle 100 peripheral view (i.e., a composite 360 degree top view image) around the vehicle. In one embodiment, the image display device 26 can display the imaging process for modification of the sensitivity of the cameras 16, 18, 20, 22.

As illustrated in FIG. 2, in one embodiment, camera 16 captures an image of an area adjacent the vehicle (any one of the cameras 16, 18, 20, 22 or each of the cameras 16, 18, 20, 22 can capture an image, camera 16 is only shown for illustrative purposes). The image is formed from an array of pixels and may include an edge or a plurality of edges. An edge in this image may refer to a part of the image in which the luminance of a pixel sharply changes (e.g., curbs, lane markers or edges of roads). In one embodiment, the Canny edge detecting method may be used. However, it is noted that any suitable edge detection method or device may be used.

In this embodiment, each pixel has 2-dimensional coordinates in a u-v coordinate system. For example, the first pixel 52 shown in FIG. 2 has a specific coordinate in the u-v coordinate system. Preferably the origin for both the u and v axes is along a central axis of the camera. Moreover, the plane defined by the u-v coordinate system is transverse to or perpendicular to the central axis of the camera.

Figure 3:
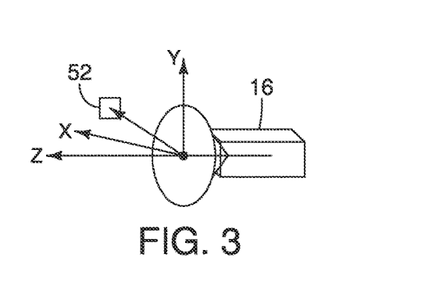

As shown in FIG. 3, an internal parameter system 28 then determines the image coordinate of each of the pixels in the image (e.g., pixel 52), using for example, OCamCalib. That is, the internal parameter system 28 determines where in a 3 dimensional coordinate system, such as the X-Y-Z coordinate system of FIG. 3, the pixel is positioned.

Figure 4:
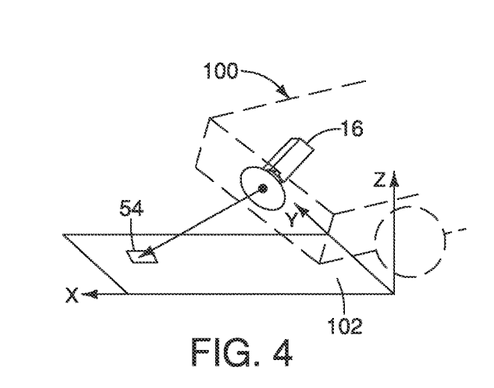
FIG. 4 illustrates the identification of a point on the ground relative to a vehicle.

Turning now to FIG. 4, the sensitivity modification system 10 determines the position of portion 54 of the image in the first pixel relative to the vehicle 100 on the ground plane 102. That is, based on the location and angle of each camera relative to the vehicle 100 and the position of the vehicle 100, the sensitivity modification system 10 can determine the location of the portion 54 of the image on the ground plane 102. The position of the vehicle 100 can be determined in any manner. For example, the center of the vehicle can be assumed to be the center of a virtual world. However, if desired, the actual location of the vehicle can be determined using the positioning system 24. For example, resampling of a particle filter based on a previous predicted vehicle location can be used to determine vehicle location. The controller 14 then calculates the position of the vehicle 100 based on odometry information. Such information may be acquired via the sensors or in any other suitable manner. Additionally, if desired, the positioning system 24 may use GPS 59 to determine the vehicle location, or any suitable system or method or combination of systems or methods.

Figure 5:
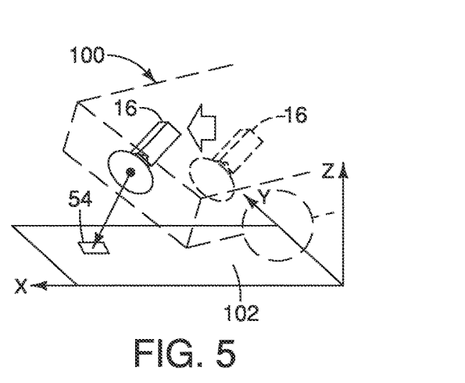
FIG. 5 shows the movement of a vehicle relative to the point on the ground in FIG. 4.
Figure 6:
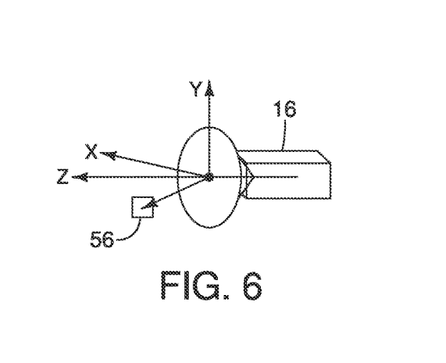
FIG. 6 illustrates the identification of a pixel in an image to which the point of the ground corresponds after the vehicle has been moved.
Figure 7:
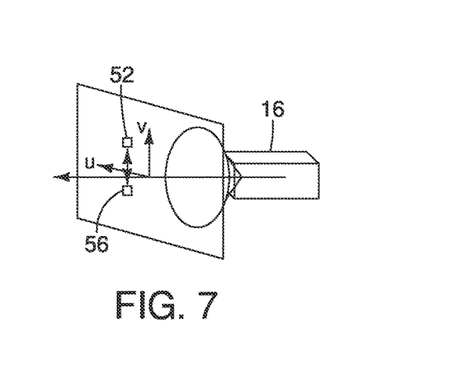
FIG. 7 illustrates the distance between the pixel from FIG. 3 and the pixel FIG. 6.

As shown in FIG. 5, the controller 14 then moves the vehicle in the virtual world a predetermined distance or angle. Based on the known predetermined distance or angle that the vehicle traveled in the virtual world, and the location and position of the camera, and thus the hypothetical position of the portion 54 of the image on the ground plane 102 represented by the first pixel 52 is known. The controller 14 converts this position back into the 3-dimensional X-Y-Z camera coordinate as second pixel 56, as shown in FIG. 6. Moreover, based on the known properties of the camera, including the lens properties, the internal parameter system 28 (e.g., OCamCalib) converts second pixel 56 in the 3-dimensional X-Y-Z camera coordinate back into a 2-dimensional image coordinate in the u-v coordinate system as second pixel 57 in an image, as shown in FIG. 7. The controller 14 then can calculate the distance between the first pixel 52 and the second pixel 56. The distance between the first pixel 52 and the second pixel 56 is then used to calculate the sensitivity of the camera 16. For example, the distance sensitivity (Sp) or angular sensitivity (Sa) can be calculated by the following formulas:

$Sp = A \times d$ (where $A$ is a predetermined coefficient and $d$ is the distance between the pixels); or $Sa = B \times d$ (where $B$ is a predetermined coefficient and $d$ is the distance between the pixels).

Figure 8:
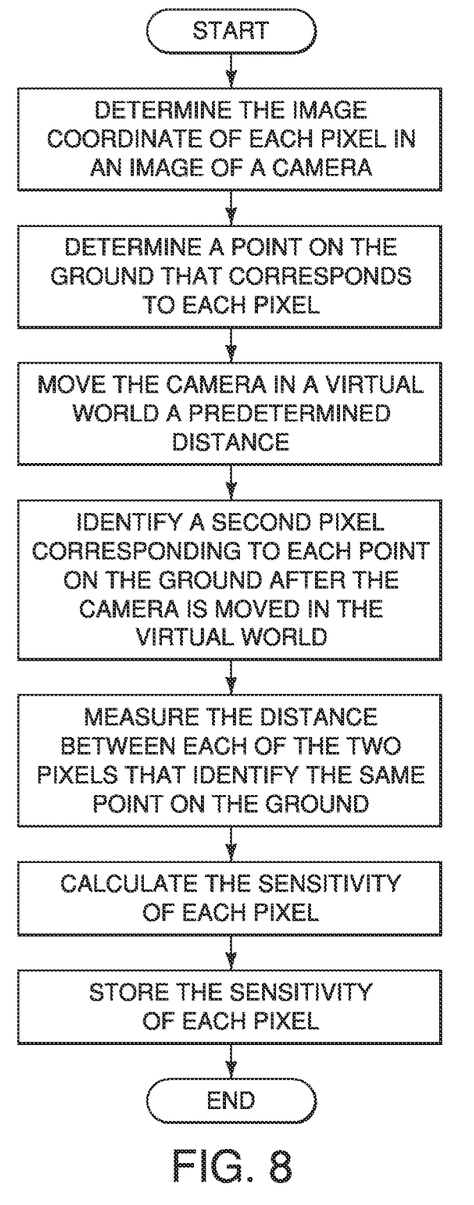
FIG. 8 is a flow chart illustrating the steps executed by a vehicle control system to determine the sensitivity of a camera according to a disclosed embodiment.

As is understood, the vehicle moves in 3 dimensions, on Sp and Sp may be the sum of individual vectors in 3 directions. For example:

$Sp_x$ (movement along $X$ axis) $= A_x \times d$ $Sp_y$ (movement along $Y$ axis) $= A_y \times d$ $Sp_z$ (movement along $Z$ axis) $= A_z \times d$ $Sp = Sp_x + Sp_y + Sp_z$ $Sa_x$ (rotatation along $X$ axis) $= B_x \times d$ $Sa_y$ (rotatation along $Y$ axis) $= B_y \times d$ $Sa_z$ (rotatation along $Z$ axis) $= B_z \times d$ $Sa = Sa_x + Sa_y + Sa_z$ Thus, FIG. 8 illustrates the general procedure in calculation of the sensitivity of the cameras. That is, as shown in FIG. 8, the sensitivity modification system 10 (e.g., the controller 14) determines the image coordinate of each pixel in an image of a camera. The sensitivity modification system 10 then determines a point on the ground that corresponds to each pixel. The vehicle is moved in a virtual world a predetermined distance or at a predetermined angle. It is noted that although the preferred embodiment is to move the vehicle in a virtual world, if desired the vehicle can moved in the real world. A second pixel is identified corresponding to each point on the ground after the camera is moved in the virtual world, The distanced between each of the two pixels that identify the same point on the ground is measure or calculated. Based on this distance, the sensitivity of each pixel can be calculated using the controller 14. The sensitivity of each pixel is then stored in the storage device 50 (or the storage device in the controller, or any suitable storage device). As discussed above, the sensitivity for each pixel can be calculated related to the distance sensitivity and the angular sensitivity.

Figure 9:
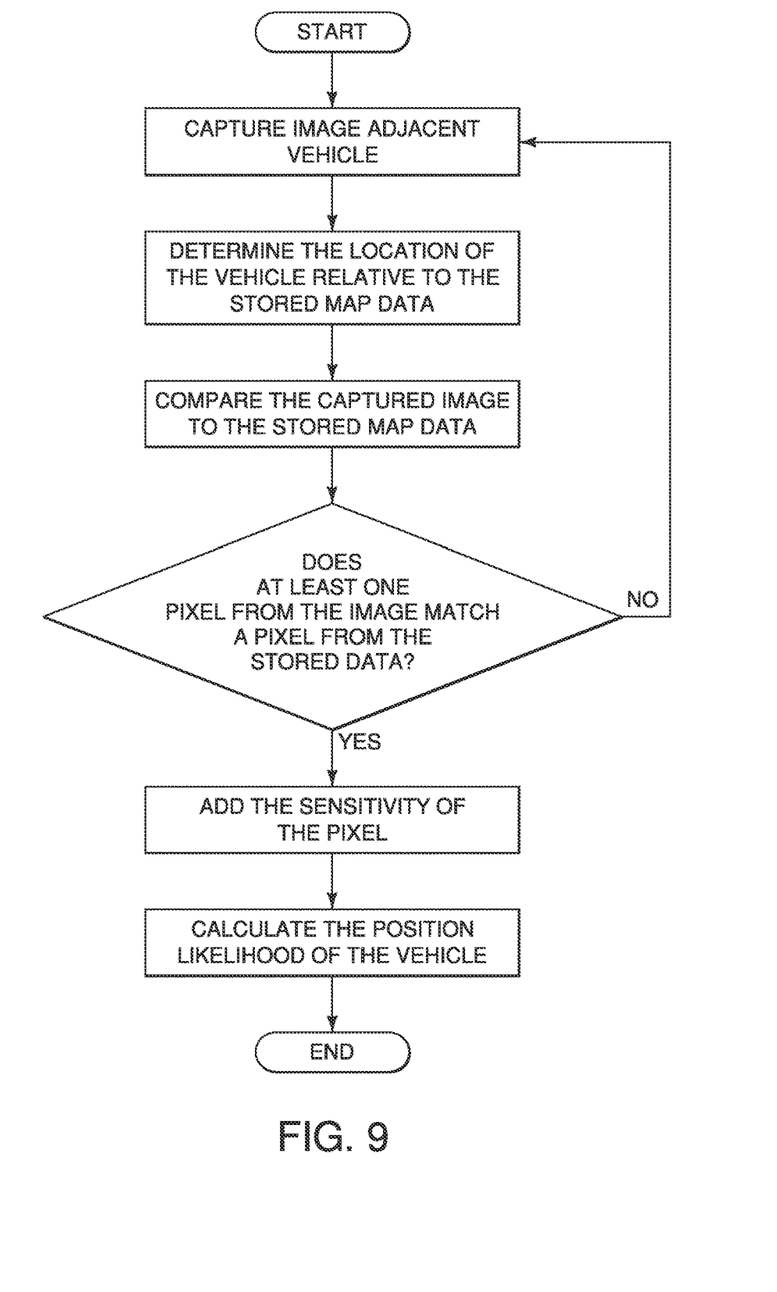
FIG. 9 is a flow chart illustrating the steps executed by a vehicle control system to add the sensitivity of each pixel in a vehicle control system.

FIG. 9 is a flow chart illustrating the addition of the sensitivity of each pixel in a vehicle control system 12. In this embodiment, the sensitivity of the camera for each pixel as it relates to position and angle has been determined, as discussed above. It is noted that the sensitivity of each pixel can be determined once for the system (e.g., at the factory) or each time the vehicle is started, or at any suitable time or any combination of times. This information can be stored in any suitable manner, for example, in storage device 50 or in a storage device in the controller, or any suitable storage device, as desired. As the vehicle attempts to determine position, an image is captured by the cameras 16, 18, 20, 22. In one embodiment, edge detection in the captured image can be performed. Next, "resampling" of a particle filter based on previous predicted vehicle position is performed. That is, multiple hypothetical vehicle positions are estimated. If there is no previous prediction, GPS data may be used (e.g., for the first loop). A "prediction" of particle filter based on odometry information is performed (i.e., move previously made multiple hypothesis). The controller 14, creates a virtual image for each hypothetical vehicle position based on a predicted position and map database. The image captured by the camera is compared to the virtual images and when a pixel from the image captured by the camera matches a pixel from a virtual image, likelihood of position and rotation is added separately based on sensitivity of position and angle. From this data, the position likelihood of the vehicle is calculated. However, if no pixels match the process is restarted.

It is noted that the steps discussed herein (e.g., FIGS. 8 and 9) are exemplary only and may be performed in any order desired. Moreover, steps may be removed or added, if desired.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," or "element" when used in the singular can have the dual meaning of a single part or a plurality of parts. Also as used herein to describe the above embodiment(s), the following directional terms "front", and "rear", as well as any other similar directional terms refer to those directions of a vehicle equipped with the vehicle camera based localization.

Accordingly, these terms, as utilized to describe the present invention should be interpreted relative to a vehicle equipped with the vehicle camera based localization.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function. The terms of degree such as "substantially", as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A system for calculating a sensitivity of a camera in a vehicle control system, the system comprising:
   an internal parameter system configured to determine an image coordinate of a first pixel in an image;
   a controller configured to determine a point on the ground that corresponds to the first pixel in the image based on a positioning system, the controller configured to move a vehicle in a virtual world a predetermined distance or at a predetermined angle without actual movement of the vehicle, identify a second pixel in the image to which the point on the ground corresponds after the vehicle is moved in the virtual world, and calculate the sensitivity of the camera based on a distance between a position of the first pixel in the image and a position of the second pixel in the image, the sensitivity of the camera including a distance sensitivity and an angular sensitivity, the distance sensitivity (Sp) being calculated by a first formula:

$Sp = A \times d$ (where $A$ is a first predetermined coefficient and $d$ is the distance between the first and second pixels), and the angular sensitivity (Sa) being calculated by a second formula:

$Sa = B \times d$ (where $B$ is a second predetermined coefficient and $d$ is the distance between first and second pixels); and a storage device configured to store the sensitivity of the camera, and
   the controller configured to update the sensitivity of the camera with an updated sensitivity.

2. The system according to claim 1, wherein the internal parameter system is an internal calibration unit.

3. The system according to claim 1, wherein the positioning system includes sensors.

4. The system according to claim 1, wherein the positioning system includes a global positioning system.

5. The system according to claim 1, wherein the first and second pixels are two pixels in an array of pixels, and the controller is configured to calculate the sensitivity of the camera based on a distance between two pixels for each of the pixels in the array of pixels.

6. The system according to claim 5, wherein the controller is configured to apply a sensitivity of the pixel array in determining a position of the vehicle.

7. The system according to claim 1, wherein the controller is configured to calculate the sensitivity of the camera as the sensitivity relates to a position of the vehicle.

8. The system according to claim 1, wherein the controller is configured to calculate the sensitivity of the camera as the sensitivity relates to an angle of the vehicle.

9. The system according to claim 1, wherein the controller is configured to update the sensitivity of the camera each time the vehicle is started.

10. A system for calculating a sensitivity of a camera in a vehicle control system, the system comprising:
    the camera disposed on a vehicle, the camera configured to capture an image of an object external to the vehicle, such that the image can be displayed using at least a first pixel and a second pixel in an array of pixels;
    an internal parameter system configured to determine an image coordinate of the first pixel in the image;
    a controller configured to determine a point on the ground that corresponds to the first pixel in the image based on a positioning system, move the vehicle in a virtual world a predetermined distance, identify the second pixel in the image to which the point of the ground corresponds after the vehicle is moved in the virtual world the predetermined distance without actual movement of the vehicle, and calculate the sensitivity of the camera based on a distance between the position of the first pixel in the image and the position of the second pixel in the image,
    the sensitivity of the camera including a distance sensitivity and an angular sensitivity, the distance sensitivity (Sp) being calculated by a first formula:

$Sp = A \times d$ (where $A$ is a first predetermined coefficient and $d$ is the distance between the first and second pixels), and the angular sensitivity (Sa) being calculated by a second formula:

$Sa = B \times d$ (where $B$ is a second predetermined coefficient and $d$ is the distance between first and second pixels); and a storage device configured to store the sensitivity of the camera, and
    the controller configured to update the sensitivity of the camera with an updated sensitivity.

11. The system of claim 10, wherein the internal parameter system is an internal calibration unit.

12. The system according to claim 10, wherein the positioning system includes sensors.

13. The system according to claim 10, wherein the positioning system includes a global positioning system.

14. The system according to claim 10, wherein the first and second pixels are two pixels in the array of pixels, and the controller is configured to calculate the sensitivity of the camera based on a distance between two pixels for each of the pixels in the array of pixels.

15. The system according to claim 14, wherein the controller is configured to apply a sensitivity of the pixel array in determining a position of the vehicle.

16. A method of calculating a sensitivity of a camera in a vehicle control system, the method comprising:
    determining, with an internal parameter system, an image coordinate of a first pixel in an image;
    determining a point on the ground that corresponds to the first pixel in the image based on a positioning system;
    moving a vehicle in a virtual world a predetermined distance without actual movement of the vehicle;
    identifying a second pixel in the image to which the point of the ground corresponds after the vehicle is moved in the virtual world;
    calculating the sensitivity of the camera based on a distance between a position of the first pixel in the image and a position of the second pixel in the image,
    the sensitivity of the camera including a distance sensitivity and an angular sensitivity, the distance sensitivity (Sp) being calculated by a first formula:

$Sp = A * d$ (where $A$ is a first predetermined coefficient and $d$ is the distance between the first and second pixels), and the angular sensitivity (Sa) being calculated by a second formula:

$Sa = B*d$ (where $B$ is a second predetermined coefficient and $d$ is the distance between first and second pixels); and storing the sensitivity of the camera in a storage device; and updating the sensitivity of the camera with an updated sensitivity.

17. The method according to claim 16, wherein the positioning system includes sensors.

18. The method according to claim 16, wherein the positioning system includes a global positioning system.

19. The method according to claim 16, wherein the first and second pixels are two pixels in an array of pixels, and calculating the sensitivity of the camera based on a distance between two pixels for each of the pixels in the array of pixels.

* * * * *